Feb. 24, 1931.  F. FALLA  1,794,006
REGOVERY APPARATUS
Filed Sept. 24, 1929  2 Sheets-Sheet 2
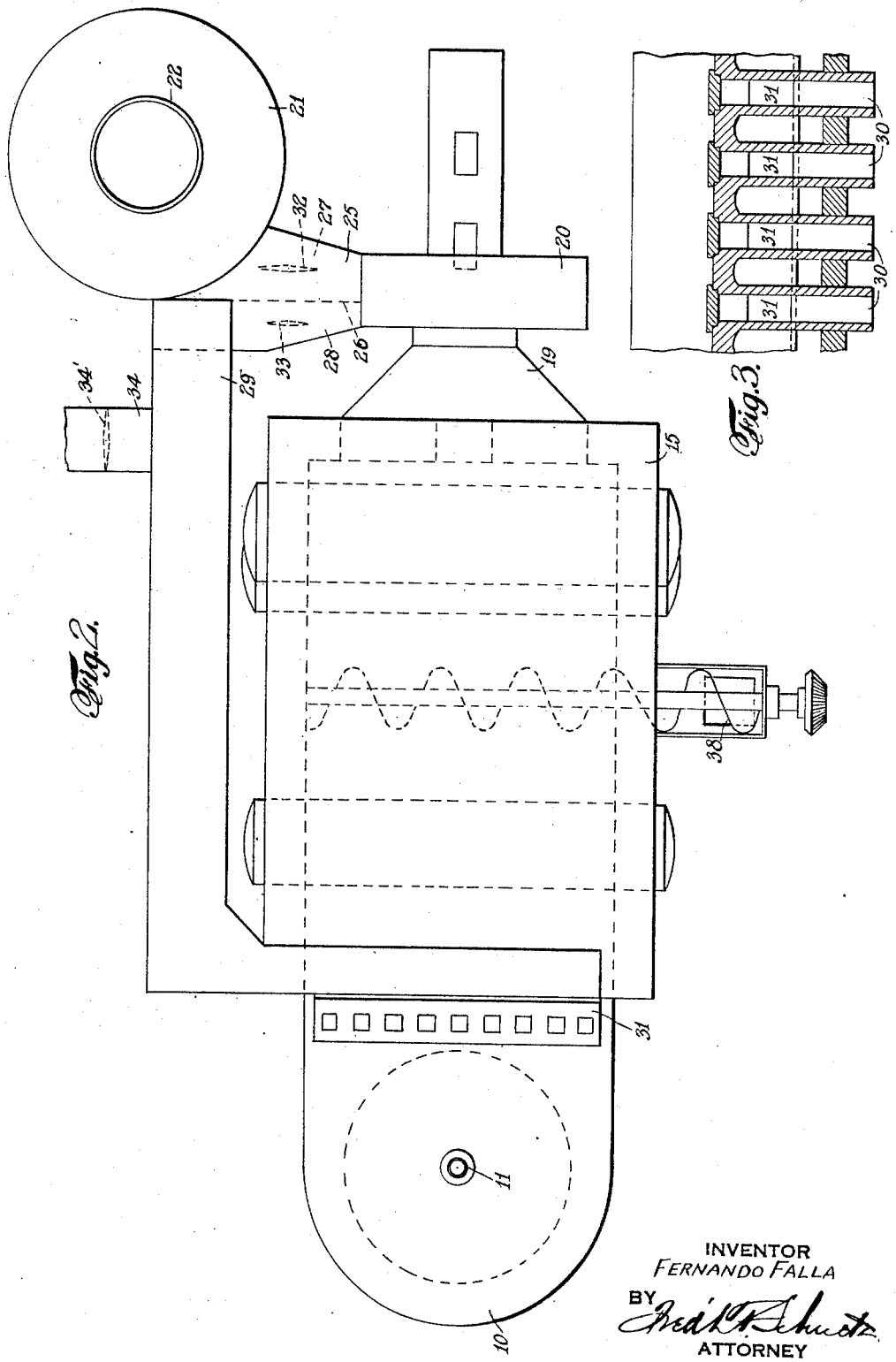
INVENTOR
FERNANDO FALLA
BY
ATTORNEY Patented Feb. 24, 1931

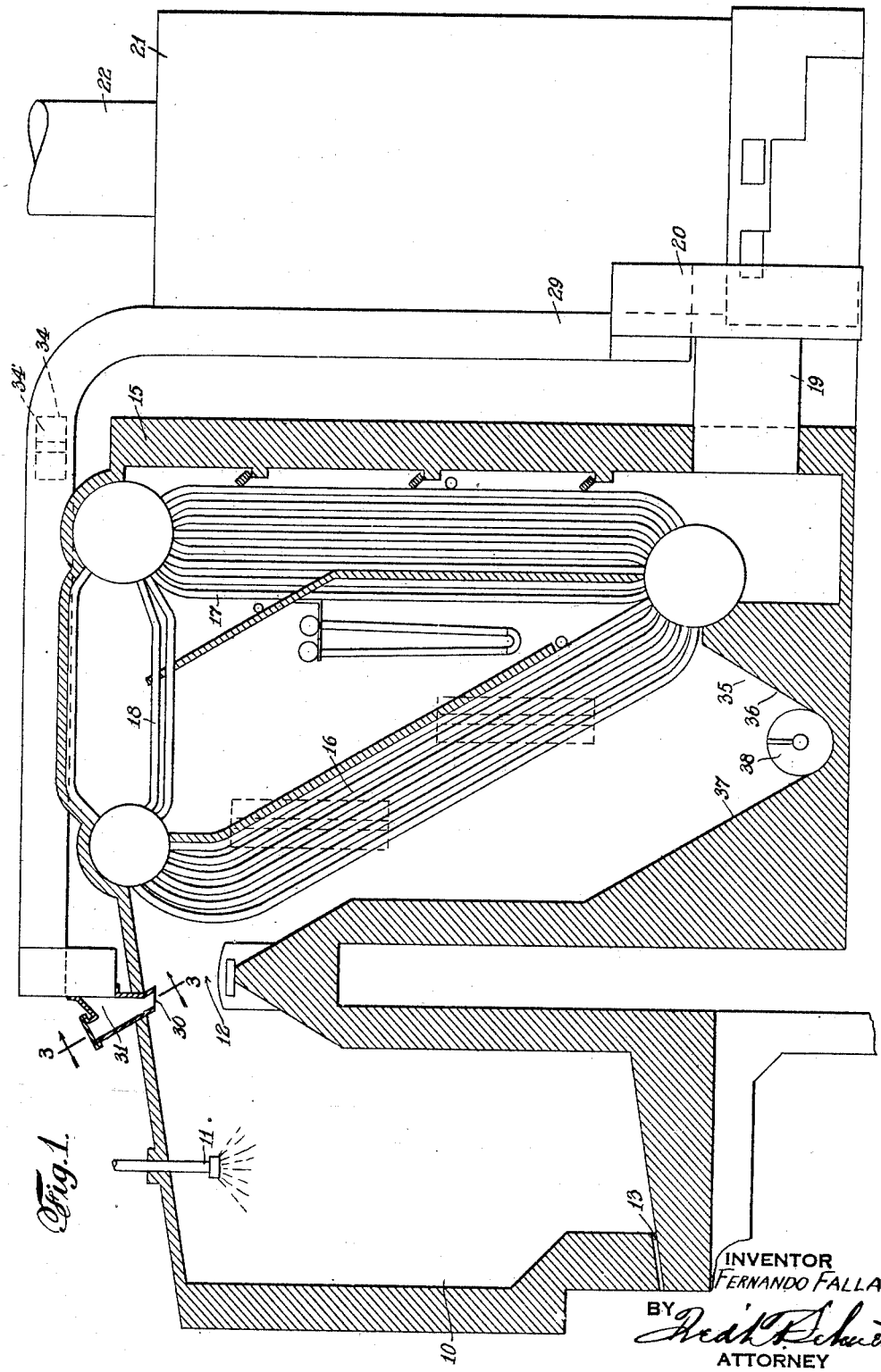

1,794,006

UNITED STATES PATENT OFFICE

FERNANDO FALLA, OF MILLBURN TOWNSHIP, ESSEX COUNTY, NEW JERSEY, ASSIGNOR TO EDGE MOOR IRON COMPANY, OF EDGE MOOR, NEW JERSEY, A CORPORATION OF DELAWARE

RECOVERY APPARATUS

Application filed September 24, 1929. Serial No. 394,785.

The invention relates to a recovery plant for treatment of the concentrated waste liquors resulting from the operation of wood pulp mills wherein wood is treated either by the sodium sulphate or bisulphite processes for the removal of the cellulose thereof. These waste cooking liquors, after being first evaporated to proper concentration, are usually treated for recovery of the chemicals utilized in the cellulose extraction by burning the residuum which consists largely of organic matter known as lignin, the combustion being effected in a suitable furnace. The resulting gaseous products of combustion, which are at a comparatively high temperature—approximately 2000° F.—are also arranged to pass through a waste heat boiler; and are finally removed by a fan or other suitable draft-inducing means, as in being discharged thereby into a scrubber or directly into the atmosphere through a suitable stack.

It has been found in carrying out these operations in the foregoing apparatus that the larger proportion of the chemicals are recovered in the furnace itself and are suitably tapped out therefrom in liquid condition. A portion, however, entrained with the outgoing gaseous products of combustion, condenses upon the boiler tubes and forms a glazed coating thereover. This, of course, interferes with the heat absorption of the boiler, and, moreover, builds up to such an extent that eventually it bridges the tube space and ultimately checks the passages for the gases.

It is the usual practice, therefore, to periodically shut down a plant of this character, for example, weekly, when the loss through the boiler becomes too high for proper operation of the furnace, whereupon the incrustation is removed and the plant again placed in service.

Furthermore, this gradual building up of incrustation on the boiler tubes effects a corresponding increase of draft loss so that uniform operation of the boiler is impossible and no steady performance over a continuous period may be had. This, of course, is quite unsatisfactory aside from the necessary periodical removal of the troublesome incrustation.

It is the object of the present invention, therefore, to so construct and arrange the apparatus that substantially all incrustation of the said chemicals on the boiler tubes, as well as the setting, is obviated and that the boiler may consequently be operated at a substantially uniform rate, and excessive overloads on the fan avoided. The furnace itself will consequently perform more satisfactorily and greater efficiency of operation thereof is attainable, in addition to dispensing with the periodical shut-down heretofore necessary.

More particularly the invention has for its object the provision of means for precipitating out the chemical matter entrained in the gaseous products of combustion, collecting the same and removing them from the apparatus.

In carrying out the invention, provision is made for introducing a cooling gaseous medium to the incoming furnace gases supplied to the boiler and reducing the temperature of the latter sufficiently to effect the precipitation therefrom of the entrained chemical ash. Said cooling medium may be obtained, for example, by bleeding a portion of the spent furnace gases as they leave the boiler and in which condition they are at a materially reduced temperature—approximately 450° F.—and returning the same to the boiler space at a point substantially at or slightly beyond the inlet of the gaseous products coming from the furnace to the boiler space.

By this expedient, the incoming furnace gases are cooled to an extent sufficient to effect precipitation of the chemical ash entrained therewith. This ash, which consists, in the soda cooking liquor, principally of the carbonate, sulphide and sulphate of soda, falls down also into the boiler setting and is collected in the bottom thereof in a suitable chamber or trough provided therein and which may contain means for bearing off the same to a point external the said boiler. The cooling effect, however, is not carried to a degree sufficient to affect the steaming operation of the boiler. For example, the furnace gases resulting from the combustion of the cooking liquor will be approximately 2000° F.; and the cooling effect due to the mixture therewith of the returned spent gases may reduce the same to approximately 1400° F. which is well above any requirements for steaming operation.

The nature of the invention, however, will best be understood when described in connection with the accompanying drawings, in which:

Fig. 1 is a longitudinal section, partly in elevation, through a furnace for burning the residuum of waste wood pulp liquors, and associated boiler apparatus operated by the gases resulting therefrom.

Fig. 2 is a plan thereof.

Fig. 3 is a fragmentary vertical section taken on the line 3—3, Fig. 1 of the drawings, and on an enlarged scale.

Referring to the drawings, 10 designates a furnace of well known or special construction suitable for the combustion of the concentrated waste cooking liquor resulting from the sodium sulphate or bisulphate treatment of wood pulp, the liquor from the digesters being delivered into the top of furnace 10 by means of a spray nozzle or the like 11. The gaseous products of combustion or furnace gases pass out through the upper portion of the furnace through a transverse opening 12, leaving said furnace at a temperature of approximately 2000° F., while the molten chemical matter is tapped out from the bottom of the furnace at a transverse opening 13, said material comprising, in the case of the sodium sulphate treatment of the wood pulp, principally sodium carbonate, sodium sulphide and sodium sulphate of which the bulk is constituted by the first-named material and consisting of over 70% thereof. The treatment of these chemicals as they come from the furnace in fused condition, as aforesaid, has nothing to do with the present invention which is concerned more especially with the minor quantities of the aforesaid chemicals entrained with and passing out with the said furnace gases through the opening 12.

In accordance with the general practice, these furnace gases are designed to be utilized for recovery of the heat thereof as in operating a steam boiler, for example, the water-tube boiler 15 shown associated therewith and having the banks of tubes 16, 17 and 18 separated by suitable passes.

The outlet of the boiler is at 19, which is connected with a fan 20 for inducing sufficient draft to draw these furnace gases through the opening 12 and the boiler-passes and finally discharge them through the outlet 19 of the boiler. The fan 20 may deliver the spent gases directly to the atmosphere; but it is preferred to pass them first through a scrubber 21 which, in turn, discharges into a stack 22 opening into the atmosphere.

In accordance with the invention, however, and in order to prevent the incrustation of the entrained chemical material of the gases on the boiler tubes, provision is made for cooling the incoming furnace gases, for example, by returning a portion of the spent furnace gases to the boiler space. To this end, the outlet chamber 25 of the fan 20 is divided by a partition 26 into two compartments 27 and 28, respectively, the latter communicating with a duct 29 passing around the boiler and leading back to the furnace end thereof, more particularly for discharging the diverted spent furnace gases substantially at the opening 12 or slightly beyond the same. This discharge into the boiler space is effected preferably through a series of nozzles 30 extending through the top of the furnace from a manifold 31 and directed into the first pass of the boiler, preferably substantially parallel to the corresponding bank of tubes 16.

These nozzles are designed to give the desired velocity to the incoming jets; and dampers 32 and 33 are provided respectively in the chambers 27 and 28 to regulate the pressure of the furnace gases thus diverted through the duct 29 into the boiler space by changing the back-pressure upon the fan. A duct 34 with controlling damper 34' may be connected with the duct 29 for affording an auxiliary supply of cooling medium from any suitable source (not shown); or, it may be utilized to provide the entire supply of such medium in certain instances, as when it is desired to operate fan 20 at maximum efficiency.

By means of the foregoing arrangement, a curtain of relatively cool gas as the spent furnace gases—at approximately 450° F.— is interposed between the incoming high temperature furnace gases and the first bank 16 of boiler tubes. The temperature of the interposed gas, however, is higher than the steam temperature on the inside of the said tubes, and, therefore, does not chill the same. Furthermore, by suitably designing the nozzles 30, the volume and velocity of the interposed gases may be varied to suit the requirements. In any event, the degree of cooling, determined by the volume and temperature of the introduced gases, is such that the temperature of the mixture will be slightly less than the solidifying temperature of the sodium chemicals contained in the furnace gases coming from furnace 10, for example, 1400° F. This, therefore, produces a sudden condensation of the sodium salts in the immediate vicinity of the inlet to boiler 15 of the apparatus; and the sodium salts in suspension or entrained with the furnace gases will precipitate or settle out therefrom in the form of dust, dropping to the bottom of the boiler into a collecting chamber 35 provided therein. The latter extends transversely over the forward bottom portion of the boiler and has its side walls 36 and 37 inclined to provide a trough-like collecting chamber wherein the chemical ash will accumulate. Suitable means, as the spiral conveyer 38, is provided therein to remove this chemical ash thus precipitated which is removed externally of the boiler thereby, as is well understood.

As a result of the precipitation of these sodium salts in the manner aforesaid, the same will be substantially eliminated from furnace gases flowing through the various passes of a boiler so that condensation of the same will not occur upon or within its tubes, and a clean boiler will be maintained throughout long periods of operation. This provides, also, for constant draft-loss through the boiler, enabling operation of the furnace 10 at maximum capacity and without requiring constant attention to the regulation of the draft which has been necessary heretofore due to the gradual closing of the spaces between boiler tubes from incrustation by the entrained chemical matter in the gases.

I claim:

1. The combination with a furnace for the combustion of the residuum of waste wood-pulp liquors, a steam boiler operated by the furnace gases therefrom, and a source of cooling gaseous medium; of means to introduce said cooling gaseous medium to the boiler space at a point beyond the inlet of the said furnace gases thereto, whereby said furnace gases will be cooled to an extent sufficient to precipitate therefrom the chemical ash entrained therewith.

2. The combination with a furnace for the combustion of the residuum of waste wood-pulp liquors, a steam boiler operated by the furnace gases therefrom, and a source of cooling gaseous medium; of means to introduce said cooling gaseous medium to the boiler space at a point beyond the inlet of the said furnace gases thereto, whereby said furnace gases will be cooled to an extent sufficient to precipitate therefrom the chemical ash entrained therewith; and means to collect said ash in and remove it from said boiler.

3. The combination with a furnace adapted for the combustion of the residuum of waste wood-pulp liquors, a steam boiler operated by the furnace gases therefrom, and means to draw said gases through the boiler; of means to bleed a predetermined portion of the spent furnace gases, and means to return the same to the boiler space at a point beyond the inlet of the said furnace gases thereto, whereby said furnace gases will be cooled to an extent sufficient to precipitate therefrom the chemical ash entrained therewith.

4. The combination with a furnace adapted for the combustion of the residuum of waste wood-pulp liquors, a steam boiler operated by the furnace gases therefrom, and means to draw said gases through the boiler; of means to bleed a predetermined portion of the spent furnace gases, and means to return the same to the boiler space at a point beyond the inlet of the said furnace gases thereto and in proximity to the boiler tubes of the first pass of said boiler, whereby said furnace gases will be cooled to an extent sufficient to precipitate therefrom the chemical ash entrained therewith.

5. The combination with a furnace adapted for the combustion of the residuum of waste wood-pulp liquors, a steam boiler operated by the furnace gases therefrom, and means to draw said gases through the boiler; of means to bleed a predetermined portion of the spent furnace gases, means to return the same to the boiler space at a point beyond the inlet of the said furnace gases thereto, whereby said furnace gases will be cooled to an extent sufficient to precipitate therefrom the chemical ash entrained therewith, and a collecting chamber within the boiler for receiving said ash.

6. The combination with a furnace adapted for the combustion of the residuum of waste wood-pulp liquors, a steam boiler operated by the furnace gases therefrom, and means to draw said gases through the boiler; of means to bleed a predetermined portion of the spent furnace gases, means to return the same to the boiler space at a point beyond the inlet of the said furnace gases thereto, whereby said furnace gases will be cooled to an extent sufficient to precipitate therefrom the chemical ash entrained therewith, a collecting chamber within the boiler for receiving said ash, and means to remove ash collected therein.

7. The combination with a furnace adapted for the combustion of the residuum of waste wood-pulp liquors, a steam boiler operated by the furnace gases therefrom, and means to draw said gases through the boiler; of means to bleed a predetermined portion of the spent furnace gases, means to return the same to the boiler space at a point beyond the inlet of the said furnace gases thereto, whereby said furnace gases will be cooled to an extent sufficient to precipitate therefrom the chemical ash entrained therewith, a collecting chamber within the boiler for receiving said ash, and a screw conveyer mounted in the bottom of the collecting chamber for bearing off the ash collected therein.

8. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, and a duct connected with the separated portion for receiving the said diverted portion of the gases and discharging them into the boiler space at a point beyond the inlet of the original gases thereto, whereby said furnace gases will be cooled to an extent sufficient to precipitate therefrom the chemical ash entrained therewith.

9. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a duct connected with the separated portion for receiving the said diverted portion of the gases and discharging them into the boiler space at a point beyond the inlet of the original gases thereto, whereby said furnace gases will be cooled to an extent sufficient to precipitate therefrom the chemical ash entrained therewith, and an auxiliary duct connected with said first-named duct for supplying a cooling medium thereto, and a damper therein.

10. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a damper in said separated portion, and a duct connected with the separated portion for receiving the said diverted portion of the gases and discharging them into the boiler space at a point beyond the inlet of the original gases thereto, whereby said furnace gases will be cooled to an extent sufficient to precipitate therefrom the chemical ash entrained therewith.

11. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a damper in said separated portion, a damper in the remaining portion of the fan outlet, and a duct connected with the separated portion for receiving the said diverted portion of the gases and discharging them into the boiler space at a point beyond the inlet of the original gases thereto, whereby said furnace gases will be cooled to an extent sufficient to precipitate therefrom the chemical ash entrained therewith.

12. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a duct connected with the separated portion for receiving the said diverted portion of the gases, and a series of nozzles connected with the outlet of said duct and directed into the boiler space.

13. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a duct connected with the separated portion for receiving the said diverted portion of the gases, and a series of nozzles connected with the outlet of said duct and directed into the boiler space beyond the inlet of the said furnace gases thereto and in a direction substantially parallel to the boiler tubes of the first pass thereof.

14. The combination with a furnace adapted for the combustion of the residuum of waste wood-pulp liquors, a steam boiler operated by the furnace gases therefrom, an exhaust fan connected with said boiler having a partition mounted in its outlet to separate and divert a portion of the spent furnace gases, a damper in said separated portion, a duct connected with the separated portion of receiving the said diverted portion of the gases and discharging them into the boiler space at a point beyond the inlet of the original gases thereto, whereby said furnace gases will be cooled to an extent sufficient to precipitate therefrom the chemical ash entrained therewith, and an auxiliary duct connected with said first-named duct for supplying a cooling medium thereto, and a damper therein.

In testimony whereof I affix my signature.

FERNANDO FALLA.